(12) United States Patent
Golden

(10) Patent No.: US 9,305,405 B2
(45) Date of Patent: Apr. 5, 2016

(54) REEFER FUEL TAX REPORTING FOR THE TRANSPORT INDUSTRY

(75) Inventor: Michael Golden, San Diego, CA (US)

(73) Assignee: Omnitracs, LLC, Dallas, TX (US)

( * ) Notice: Subject to any disclaimer, the term of this patent is extended or adjusted under 35 U.S.C. 154(b) by 996 days.

(21) Appl. No.: 11/768,798

(22) Filed: Jun. 26, 2007

(65) Prior Publication Data

US 2009/0006107 A1    Jan. 1, 2009

(51) Int. Cl.
| | |
|---|---|
| G06Q 10/10 | (2012.01) |
| G06Q 30/02 | (2012.01) |
| G06Q 10/06 | (2012.01) |
| G06Q 30/06 | (2012.01) |
| G06Q 10/08 | (2012.01) |
| G07C 5/00 | (2006.01) |
| G01F 1/66 | (2006.01) |
| G01F 9/00 | (2006.01) |
| G07C 5/08 | (2006.01) |
| G08C 23/02 | (2006.01) |

(52) U.S. Cl.
CPC ............... *G07C 5/008* (2013.01); *G01F 1/667* (2013.01); *G01F 9/001* (2013.01); *G06Q 10/0637* (2013.01); *G07C 5/085* (2013.01); *G08C 23/02* (2013.01)

(58) Field of Classification Search
USPC ........... 705/1, 1.1; 73/114.42, 114.52–114.54
See application file for complete search history.

(56) References Cited

U.S. PATENT DOCUMENTS

| | | | |
|---|---|---|---|
| 3,252,322 A | 5/1966 | Pring | |
| 4,470,035 A * | 9/1984 | Kosuge | 340/439 |
| 4,510,576 A * | 4/1985 | MacArthur et al. | 702/182 |
| 4,928,274 A | 5/1990 | Gilhousen et al. | |
| 4,979,170 A | 12/1990 | Gilhousen et al. | |
| 5,017,926 A | 5/1991 | Ames et al. | |
| 5,303,163 A * | 4/1994 | Ebaugh et al. | 700/274 |
| 5,557,938 A * | 9/1996 | Hanson et al. | 62/126 |
| 5,694,322 A | 12/1997 | Westerlage et al. | |
| 5,928,291 A * | 7/1999 | Jenkins et al. | 701/1 |
| 5,954,773 A | 9/1999 | Luper | |
| 5,970,481 A | 10/1999 | Westerlage et al. | |
| 5,974,356 A | 10/1999 | Doyle et al. | |
| 6,009,761 A * | 1/2000 | Taylor et al. | 73/861.27 |
| 6,124,810 A | 9/2000 | Segal et al. | |

(Continued)

FOREIGN PATENT DOCUMENTS

| | | |
|---|---|---|
| EP | 1950509 | 7/2008 |
| JP | 2003-223699 | 8/2003 |

(Continued)

OTHER PUBLICATIONS

International Search Report—PCT/US08/068052—International Search Authority, European Patent Office—Oct. 1, 2008.
Written Opinion—PCT/US08/068052—International Search Authority, European Patent Office—Oct. 1, 2008.

*Primary Examiner* — Jonathan Ouellette

(74) *Attorney, Agent, or Firm* — Arent Fox LLP

(57) ABSTRACT

A fuel tax measuring and reporting tool is provided for a mobile refrigeration unit that is capable of providing state-by-state fuel tax reporting, automatically, relating to fuel consumed by a mobile refrigeration unit. Fuel use of an engine powering the refrigeration unit is measured based on either power consumption by, or fuel flow to, the engine. Processing of this data locally or remotely allows accurate fuel tax reporting in connection with transmission of this data from the site of the mobile refrigeration unit.

30 Claims, 3 Drawing Sheets

(56) References Cited

U.S. PATENT DOCUMENTS

| | | |
|---|---|---|
| 6,181,995 B1 | 1/2001 | Luper et al. |
| 6,564,172 B1 * | 5/2003 | Till ............................... 702/182 |
| 2004/0016284 A1 * | 1/2004 | Gysling et al. .................. 73/1.16 |
| 2005/0010479 A1 * | 1/2005 | Hannigan et al. ................ 705/19 |

FOREIGN PATENT DOCUMENTS

| | | |
|---|---|---|
| WO | 0184090 | 11/2001 |
| WO | WO 0184090 A1 * | 11/2001 |
| WO | 2007046330 | 4/2007 |

* cited by examiner

REEFER FUEL TAX REPORTING FOR THE TRANSPORT INDUSTRY

BACKGROUND

Reefer is a same often applied to a mobile refrigeration unit, particularly refrigeration units for trucks, trailers, containers and rail cars, as well as non-fixed assets such as clip-on gensets which go on sea-going containers when they travel on land. Reefers of different sizes are manufactured and they usually combine a diesel engine, separate from the truck engine providing mobility, attached to an insulated box for storing refrigerated goods. The reefer's diesel engine powers an air conditioning (A/C) unit that uses forced air to cool (or heat) the box. Refrigeration controls affixed to the refrigeration unit or in the truck are used to control and monitor various aspects of the A/C unit and box. Often the reefer's diesel engine powers the A/C unit for many hours and some reefers can be powered from an ac or dc power source when parked overnight with a load in the box. Future refrigeration units may use natural gasses or even fuel cells. Fuel economy and monitoring have become more important especially as fuel prices fluctuate on the high side. Fuel taxes are commonly assessed by taxing authorities worldwide against earners for the fuel consumed. For instance, in the United States, a state assesses taxes an fuel consumed within that state. Reporting of fuel taxes based on vehicle consumption of fuel is generally done by the driver of a commercial vehicle. However, fuel used in connection with operating a vehicle may entail consumption by systems on the vehicle other than those relating strictly to transportation, e.g., the reefer.

Today, transportation and logistics companies are required to monitor miles driven per state to pay accurate fuel taxes. Currently, this process is accomplished manually or via the use of fuel tax reporting software and an on-board GPS/computer. Due to many practical complications in applying this system to refrigerated systems for the transport industry (most of which also use diesel fuel), it is not required to report fuel tax for reefers.

Given that fuel fax is reported for a tractor trailer in connection with its crossing jurisdictional lines (e.g., state lines), a need exists to differentiate fuel consumed by the tractor from fuel consumed by the refrigeration unit on the trailer. Currently, there is no accurate way to draw a distinction between the amount of fuel consumed by transporting the reefer vs. the amount consumed by the reefer to keep the cargo at temperature. Although most reefers have a separate fuel tank for use of the reefer alone that can provide a basis to assess fuel consumption tax against the reefer, this data is not generally transmitted to taxing authorities. Further, although state border crossings of tractor trailer vehicles are often monitored, it is often difficult to track a particular reefer trailer pulled by a specific tractor as it is common for multiple tractors to aid in getting a single trailer, for example, to its final destination.

Therefore, there is a need to provide monitoring of reefer fuel consumption through the use of a fuel measurement apparatus and or in combination with an algorithm that monitors the mode of operation and time in that mode. A need also exists to employ a wireless communication system with host software to automatically report the pro rata portion of fuel taxes for a reefer especially as distinguished from other systems on a tractor trailer or from fuel consumed by the engine used to power the tractor trailer for transportation. Further, a need exists to distinguish reefer fuel consumption from tractor trailer consumption for purposes of providing detailed customer invoicing. Until now, no such system has offered such reefer fuel consumption and fuel tax reporting with the efficacy of the system to be described herein.

Figure 1:
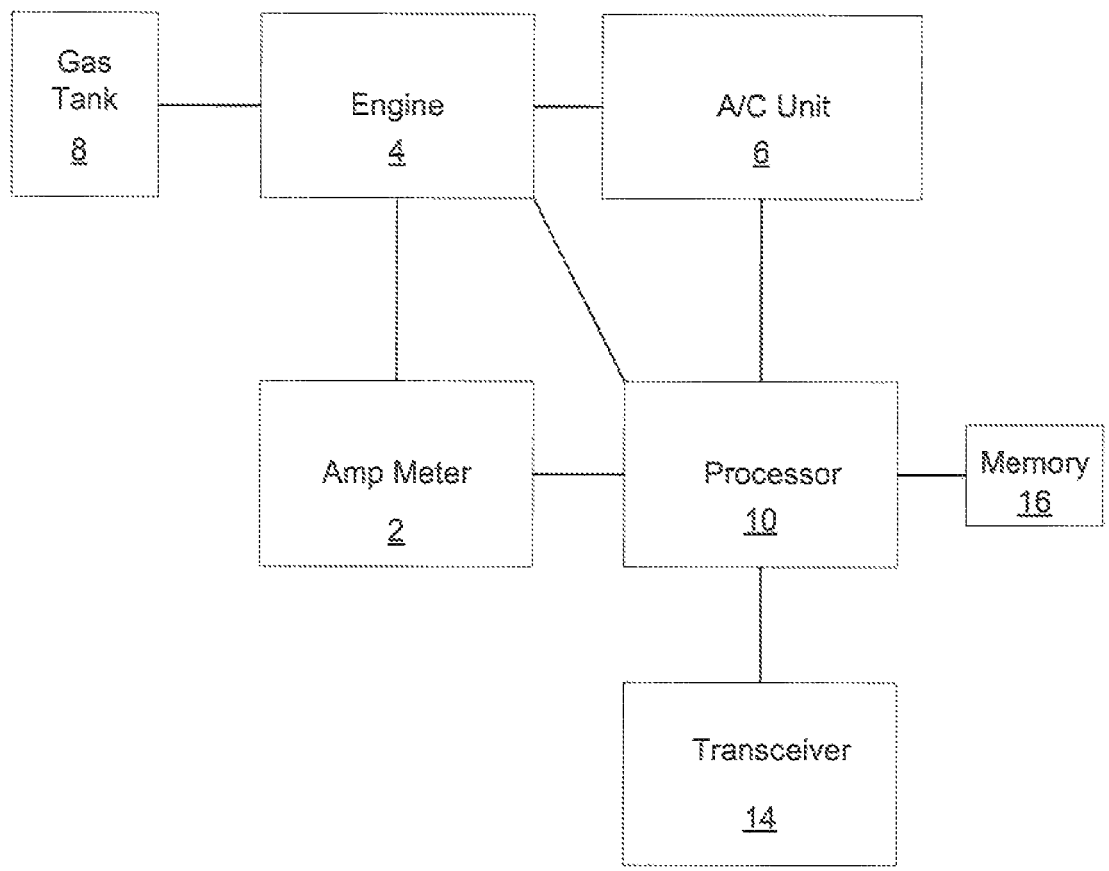
FIG. 1 illustrates a block diagram of an optional fuel measurement apparatus to be used in conjunction with measuring fuel consumption of a reefer truck or untethered reefer trailer, container, rail car, genset, or any other untethered reefer system that uses fuel or natural gas in the refrigerated transport industry.

Applicable reference numerals have been carried forward.

DETAILED DESCRIPTION

A solution to the reefer feel tax reporting problem may be provided through the use of (a) an untethered wireless trailer tracking solution with a location service such as, but not limited to GPS, GLS, Casper, etc., along with the monitoring of fuel consumption such as, but not limited to a fuel gauge, periodically reading the fuel level as monitored by the reefer itself, using and algorithm that uses engine run-time, etc. An untethered solution is one that may use but does not require assistance such as power or additional data or communications from a tractor, for example. Any wireless communication method used to transmit the data from the reefer to somewhere else. Methods include but are not limited to, WiMax, WiFi, CDMA 1x, or DO, TDMA, FDMA, OFDMA, GSM, GPRS, EDGE, UWB, Bluetooth, etc.

FIG. 1 illustrates a block diagram of a fuel measurement apparatus to be used in conjunction with measuring feel consumption of a reefer truck or untethered reefer trailer. Ampere (Amp) meter 2 measures the power used by refrigerator engine 4. This provides the wattage used by refrigerator engine 4, which typically is a diesel engine. Processor 10 connected to amp meter 2 determines the fuel consumption of the reefer. This can be accomplished by multiplying the wattage measured by amp meter 2 by the time of operation of refrigerator engine 4, thereby allowing determination of the power used per time period such as the kilowatts used per hour by the reefer. Dividing the kilowatts used per hour by a metric such as the fuel consumption per time period (such as consumption per hour) can provide the power used per fuel quantity such as the kilowatts used per gallon of fuel. Inverting this ratio and multiplying it by the price of fuel per quantity, such as fuel price per gallon, results in the price per power used over a time period such as power per kilowatt hour. The foregoing may be determined automatically using processor 10 coupled to amp meter 2. Necessary engine characteristics useful in determining above may be found in standard specification information generally obtained and reported for an engine. Further, if necessary, representative engine specification data may be measured beforehand in connection with making the above mentioned calculations.

Figure 2:
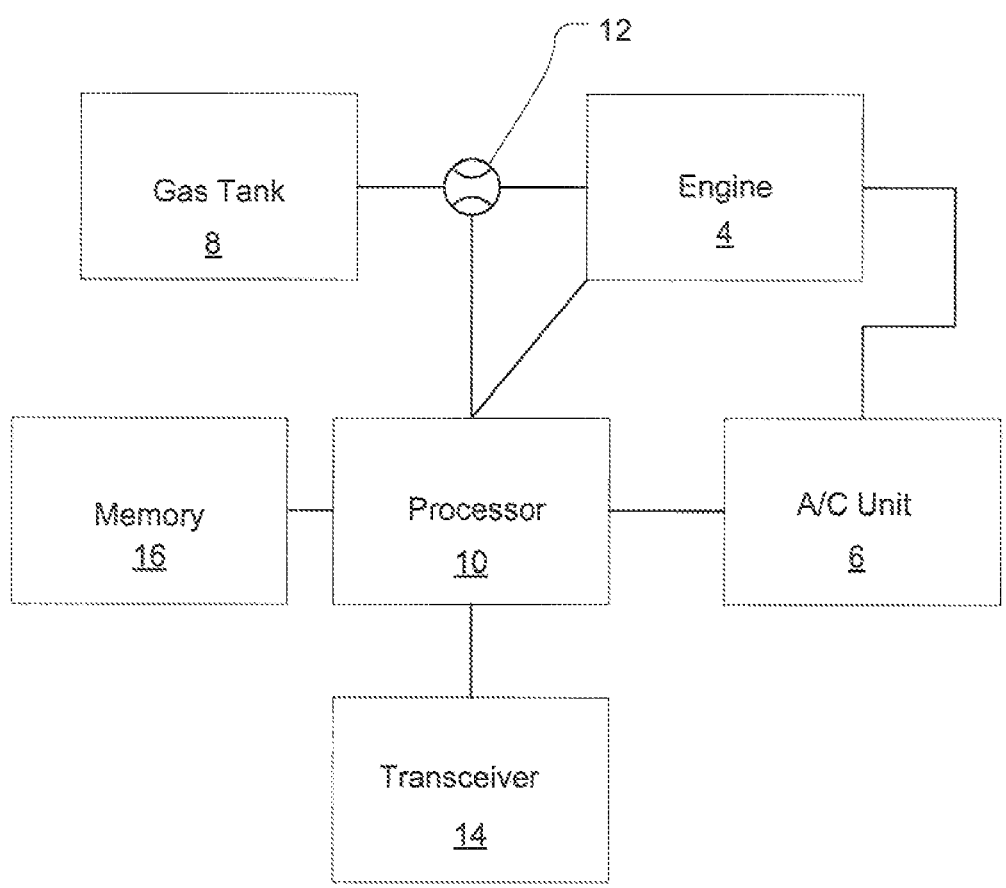
FIG. 2 illustrates a block diagram of an alternative embodiment wherein an ultrasonic flow meter which measures flow rates by clamping sensors onto the outside of a fuel passageway, such as a fuel pipe or filter, supplying fuel from a gas tank to the engine of the reefer in an effort to determine the amount of fuel consumed.

FIG. 2 illustrates a block diagram of an alternative embodiment wherein ultrasonic flow meter 12, which measures flow rates by clamping sensors onto the outside of fuel passageway 13, such as a feel pipe or filter, supplying fuel from gas tank 8 to engine 4, is used in an effort to determine the amount of fuel consumed by refrigerator engine 4. Ultrasonic flow meter 12, as its name suggests, measures fuel flow to an engine using ultrasonic waves which are non-interfering with the gasoline flowing in through passageway 13. Gas tank 8 may be shared among all gasoline powered systems on a vehicle. Alternatively, a separate gas tank 8, distinct from a gas tank used to supply mobility systems in a vehicle, may be used to power engine 4.

With reference still to FIG. 2, processor 10, connected to ultrasonic flow meter 12, is programmed to calculate the fuel consumed as measured by flow meter 12 per time period. Processor 10 may also be programmed to determine the cost of fuel used by a reefer, gathering data based on costs of fuel incurred at the gas pump.

Amp meter 2 and processor 10 of FIG. 1 may either interface with a reefer trailer or alternatively, may be built into a refer trailer so that the trailer manages feel consumption by itself. Likewise, processor 10 and flow meter 12 of FIG. 2 may also either interface with a reefer trailer or alternatively be built into a refer trailer for fuel consumption management. An algorithm may be used that (a) reads the fuel state of a reefer from processor 10 (which may be a microcontroller) (b) calculates the time in each state over a period of time, and (c) multiplies each state by tire time and then by a "fuel usage factor" to figure fuel consumption.

The foregoing embodiments illustrated in FIG. 1 and FIG. 2 support un-tethered trailer tracking such as but not limited to in Geo or T2™, a well-known untethered trailer tracking system provided by QUALCOMM Inc. Reefer Fuel Tax reporting may leverage off of T2™ using an un-tethered trailer tracking product integrating reefer fuel tax reporting. Hence, an un-tethered trailer tracking product such as T2™ may periodically assign the current fuel level of fuel tank with a GPS location and time/date stamp. Those data points would then be downloaded to the host software where the GPS locations would be translated into State/Country locations, and the fuel consumption may be summed on a per jurisdiction, e.g. state/country, basis. A simple reporting tool or exporting function may be provided, with data supplied being capable of being read only to ensure accurate un-tampered with reporting. This data may also be made available directly to taxing authorities as a service.

Figure 3:
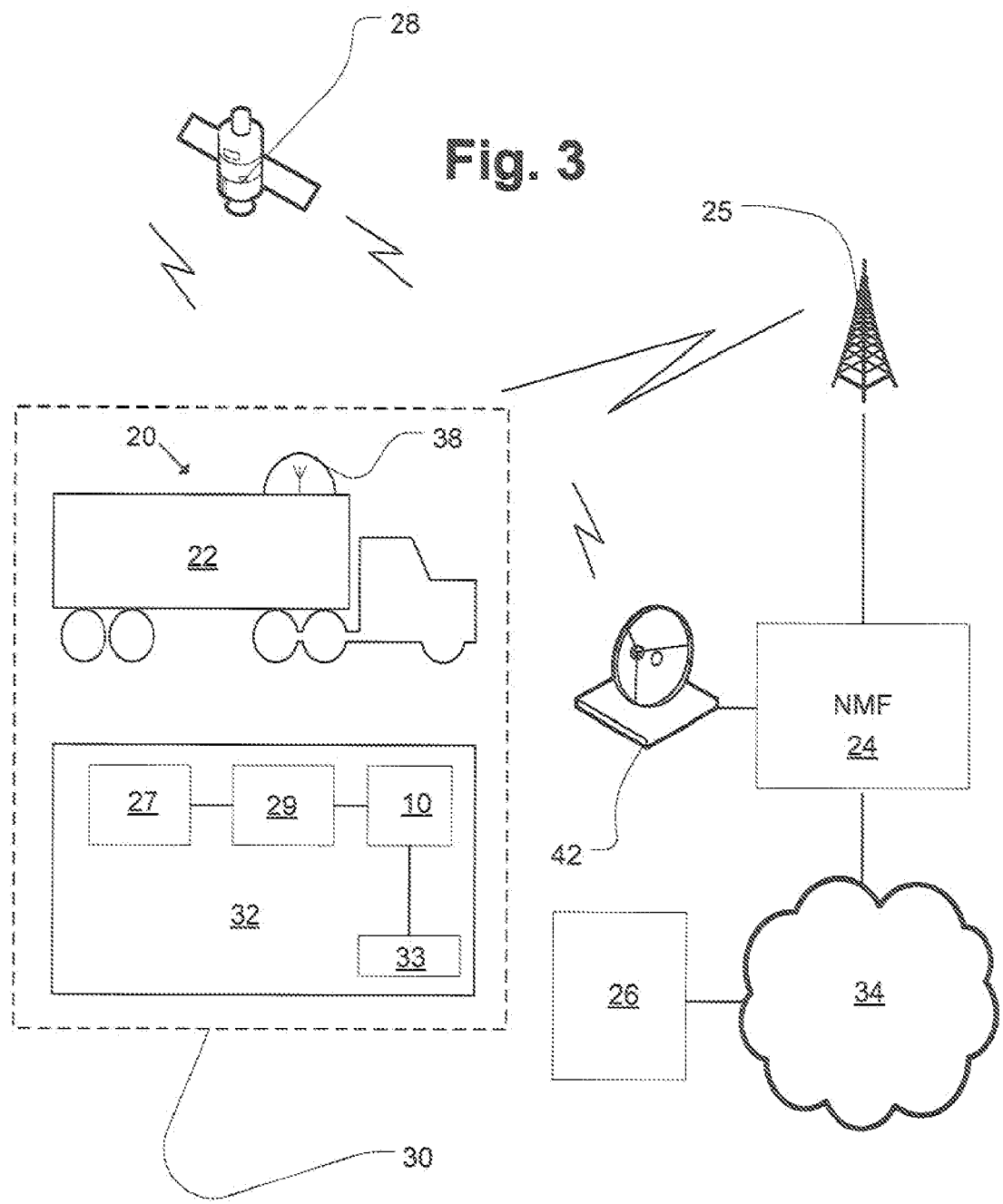
FIG. 3 illustrates a diagram of vehicle including a reefer and having a transceiver for communications with the NMF through a base station and/or a satellite.

One purpose of un-tethered trailer tracking has been traditionally for ensuring that a trailer is not parked somewhere unused for a long period of time, e.g. weeks or even days. With reference to FIGS. 1 and 2, transceiver 14 may transmit feel consumption data from processor 10 to a network management facility NMF. FIG. 3 illustrates a diagram of vehicle 20 including reefer 22 and having a transceiver (not shown) for communications with NMF 24 through base station 25 and or satellite 28. Information may additionally be prepared at or through NMF 24 (e.g. remote server) pertaining to fuel management and combined with fuel consumption data from transceiver 14 and sent to a earner customer, partner, etc 26. Fuel data may be piggybacked on existing messages pursuant to normal communications between vehicle 20 and NMF 24. Alternatively, fuel data can be transmitted using a short message service (SMS). Fuel consumption data may also be transmitted using well-known terrestrial digital communication systems such as but not limited to Global System for Mobile communication (GSM), Code Division Multiple Access (CDMA), Universal Mobile Telecommunications System (UTMS), etc. Further, satellite communications systems using satellite 28 may also transmit fuel consumption data as well as any Local Area Networks (LAN). Moreover, fuel consumption may be controlled remotely in conjunction with telematics and monitoring equipment generally aboard vehicle 20 and/or specifically aboard reefer 22. A carrier can benefit by knowing costs and legislative bodies can benefit by legislating use of the foregoing into law in an effort to assist tax authorities and tax payers in fuel tax collection and payment, respectively. Present methods of fuel tax collection are likely under-billing customers since often a reefer unit must be powered and actively operating at times when the primary vehicle engine idles. Processor 10 may figure up-to-the minute fuel consumption costs and it may be tied to memory 16 which includes a database for local storage of fuel consumption use and costs. Unit 30 may represent a refrigerated container such as a railcar. Fuel consumption date may therefore be transmitted untethered from a railcar tractor trailer, refrigerated truck or wherever form of refrigerated box. Alternatively, fuel consumption data may be forwarded to a cab or train, as the case may be, and have it reported along with a respective cab's fuel data or other vehicle information Wireless communication systems are well known for transmitting information between fixed stations and one or more geographically dispersed mobile receivers carried in trucks or on a piece of equipment. For example, the Global Positioning System (GPS), a system of low earth orbiting satellites, has been used to determine a piece of equipment's or vehicle's position. Further, satellite communication systems have also been used in the trucking industry for many years to provide messaging information between fleet-owned dispatch centers and their respective tractor-trailer vehicles. Such systems offer significant benefits to fleet owners because they allow almost instantaneous communications and real-time position information. An example of such a satellite communication system is disclosed in U.S. Pat. No. 4,979,170 entitled "Alternating Sequential Half Duplex Communication System and Method"; U.S. Pat. No. 4,928,274 entitled "Multiplexed Address Control in a TDM Communication System"; U.S. Pat. No. 5,017,926 entitled "Dual Satellite Navigation System"; and U.S. Pat. No. 6,124,810 entitled "Method and Apparatus for Automatic Event Detection in a Wireless Communication System," all of which assigned to the assignee of the present invention and all being incorporated herein by reference thereto.

In the satellite communication system described in the above-mentioned patents, fleet-owned dispatch centers communicate using land-based systems such as telephone or fiber-optic networks with a hub, otherwise known as a network management facility (NMF). The NMF acts as a central communication station through which all communications between vehicles and a dispatch center pass. The NMF includes a number of network computers (NMCs), each NMC being responsible for providing a communication path for the NMF to geographically dispersed vehicles and/or equipment in the communication system using a geo-stationary satellite. A geostationary satellite includes one or more transponders. Transponders relay up and down link signals, (providing amplification and frequency translation) between geographically-dispersed earth stations which may be fixed or in-motion. Each NMC is assigned with different up and down link frequencies in order to avoid interference involving other Mobile Communication Terminals (MCTs) that are operating on the same satellite but with a different NMC. In the satellite communication system of the above referenced patents, each NMC system is capable of handling the communication needs of approximately 30,000 vehicles. Each MCT in the communication system comprises; a transceiver, modulator/demodulator, a CPU and GPS receiver which allows for text message exchange between the driver and dispatcher and position determination of the vehicle.

With reference to FIG. 3, a wireless transceiver, known as Mobile Communications Terminal (MCT) 32, for communicating with a remote station such as NMF 24, is shown within unit 30. MCT 32 may transmit reefer fuel reporting data. In one embodiment, antennas for MCT 32 may be located within radome 38. A radome is an enclosed housing, usually made of a low-loss dielectric material, that serves to protect antennas or sensors mounted on ground-based vehicles, ships, airplanes and the like without significantly altering the electrical performance of the enclosed antenna(s) or sensor(s). In one aspect of an embodiment, MCT 32 comprises an Onmi-TRACS® satellite transceiver manufactured by QUALCOMM Incorporated of San Diego, Calif., for communicating wirelessly with satellite 30. However, MCT 32 may alternatively comprise a digital or analog cellular transceiver or other form of wireless transceiver such as but not limited to IR, Bluetooth, UWB, etc. In another embodiment, MCT 32 resides entirely onboard trailer 22. In other embodiments, MCT 32 uses a terrestrial wireless communication system to communicate reefer fuel consumption data to NMF 24, such as an analog or digital cellular telephone system (through base transceiver station (BTS) 25), or a wireless data communications network (such as a digital packet data (CDPD) network). Further, reefer fuel consumption communications may be carried out from NMF 24 using network 34 which may represent the Public Switched Telephone Network (PSTN) or a cable television network (CATV) through which wireless communications are carried out in conjunction with satellite 28 using satellite dish 42. Network 34 may also include the Internet. With reference still to FIG. 3, MCT 32 comprises an RF transceiver 27 for transmitting and receiving information. The term transceiver as used herein is also contemplated to encompass a transmitter and a receiver, separate from one another, to carry out communications. High frequency communication signals are transmitter/received by RF transceiver 27, which are down-converted into baseband signals during reception and up-converted from baseband to high frequency signals during transmission. MCT 32 also comprises a modulator/demodulator 29 which provides an interface between processor 31 and RF transceiver 27, allowing information from processor 10 to be modulated in accordance with the particular wireless communications being used by MCT 32, and also to demodulate received information for use by processor 10. In addition to providing fuel tax processing, processor 10 may control the various processes and functions of MCT 32 which may be used to control various functions of the reefer, e.g., reefer temperature control, timed reefer temperature regulation, alarm monitoring (e.g. freezer failure), etc. In one embodiment, a very minimum of fuel tax reporting processing occurs in processor 10 with the remaining processing being accomplished at a remote location, e.g. at an NMC.

The foregoing may provide an automatic state-by-state fuel tax reporting tool for reefers yielding a complete end-to-end solution that requires no human intervention. In connection with state line crossings as determined by position location information received from, for instance, GPS satellites, fuel consumption usage of the reefer may be communicated automatically to NMF 24 for purposes including fuel tax reporting and customer invoicing. For, instance, it is contemplated that fuel consumption data may be processed locally at the site of the reefer or remotely at the NMF for automatic tax reporting to a government taxing authority or other remote entity.

In connection with the remote transmission of fuel tax data it is further contemplated that transmission through the Internet, using the well-know transmission control protocol internet protocol (TCP/IP), and/or through an asynchronous transfer mode (ATM) system made be used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A mobile system for measuring fuel consumption of a mobile refrigeration unit in a transportation unit operable to connect to a vehicle for transportation, the mobile system comprising:
   an untethered system for measuring fuel consumption of the mobile refrigeration unit in an untethered transportation unit operable to attach to the vehicle, the untethered system measuring fuel consumption of the mobile refrigeration unit separately from measurement of fuel consumption of the vehicle used to transport the mobile refrigeration unit, the untethered system comprising:
      an ultrasonic flow meter coupled to a passageway supplying fuel to a refrigeration unit engine, of said mobile refrigeration unit, from a gas tank, wherein the ultrasonic flow meter ultrasonically measures a flow rate of said fuel supplied through said passageway to said refrigeration unit engine; from said gas tank;
      a processor, coupled to said ultrasonic flow meter, being programmed to detect a location of said mobile refrigeration unit, derive up-to-the-minute fuel consumption data of the mobile refrigeration unit using said flow rate received from said ultrasonic flow meter, and derive fuel tax data using said detected location and said fuel consumption data; and
      a transmitter, coupled to said processor, operable to transmit said fuel consumption data and said fuel tax data to a remote location, wherein the transmitter is operable to directly transmit the fuel consumption data and the fuel tax data to the remote location and to forward the fuel consumption data and the fuel tax data to an attached vehicle for reporting in combination with the vehicle's fuel data.

2. A mobile system as recited in claim 1 wherein said transportation unit comprises one of a truck, a dolly, a container and a trailer.

3. A mobile system as recited in claim 1 wherein said remote location comprises a network management facility.

4. A mobile system as recited in claim 1 further comprising a memory coupled to said processor, said memory being capable of storing said fuel consumption data derived by said processor.

5. A mobile system as recited in claim 1 wherein said refrigeration unit engine is coupled to said ultrasonic flow meter.

6. A mobile system as recited in claim 1, wherein the processor is further programmed to automatically transmit, via the transmitter, said fuel tax data to a government taxing authority associated with the detected location.

7. A mobile system as recited in claim 1, wherein the untethered system is operable to use at least one of power from the vehicle, additional data from the vehicle, and communications from the vehicle.

8. A mobile system as recited in claim 1, wherein the ultrasonic flow meter comprises sensors configured to clamp onto the outside of the fuel passageway supplying fuel to a refrigeration unit engine to measure fuel flow without interfering with the flow of fuel through the fuel passageway.

9. A mobile system as recited in claim 1, wherein the fuel consumption data is supplied in a read-only format.

10. A mobile system as recited in claim 1, wherein the processor is further configured to control fuel consumption by the refrigeration unit engine.

11. A mobile system as recited in claim 10, wherein the processor is configured to control at least one of temperature control and timed temperature regulation of the refrigeration unit.

12. A mobile system for measuring fuel consumption of a mobile refrigeration unit in a transportation unit operable to connect to a vehicle for transportation, the mobile system comprising:
    an untethered system for measuring fuel consumption of the mobile refrigeration unit in an untethered transportation unit operable to attach to the vehicle, the untethered system measuring fuel consumption of the mobile refrigeration unit separately from measurement of fuel consumption of the vehicle used to transport the mobile refrigeration unit, the untethered system comprising:
        an ampere meter, coupled to a refrigeration unit engine of said mobile refrigeration unit, to measure current usage of said refrigeration unit engine, wherein the current usage measured represents power used by said refrigeration unit engine;
        a processor, coupled to said ampere meter, being programmed to detect a location of said mobile refrigeration unit, derive up-to-the-minute fuel consumption data of the mobile refrigeration unit using said current usage measured by said ampere meter, and derive fuel tax data using said detected location and said derived fuel consumption data; and
        a transmitter, coupled to said processor, operable to transmit said fuel consumption data and said fuel tax data to a remote location, wherein the transmitter is operable to directly transmit the fuel consumption data and the fuel tax data to the remote location and to forward the fuel consumption data and the fuel tax data to an attached vehicle for reporting in combination with the vehicle's fuel data.

13. A mobile system as recited in claim 12 wherein said transportation unit comprises one of a truck, a dolly, a container and a trailer.

14. A mobile system as recited in claim 12 wherein said remote location comprises a network management facility.

15. A mobile system as recited in claim 12 further comprising a memory coupled to said processor, said memory being capable of storing said fuel consumption data derived by said processor.

16. A mobile system as recited in claim 12 wherein said refrigeration unit engine is coupled to said ampere meter.

17. A mobile system as recited in claim 16 wherein said refrigeration unit engine is a diesel engine.

18. A mobile system as recited in claim 12, wherein the processor is further programmed to automatically transmit, via the transmitter, said fuel tax data to a government taxing authority associated with the detected location.

19. A mobile system as recited in claim 12, wherein the untethered system may use but does not require at least one of power from the vehicle, additional data from the vehicle, and communications from the vehicle.

20. A mobile system as recited in claim 12, wherein the ultrasonic flow meter comprises sensors configured to clamp onto the outside of the fuel passageway supplying fuel to a refrigeration unit engine to measure fuel flow without interfering with the flow of fuel through the fuel passageway.

21. A mobile system as recited in claim 12, wherein the fuel consumption data is supplied in a read-only format.

22. A mobile system as recited in claim 12, wherein the processor is further configured to control fuel consumption by the refrigeration unit engine.

23. A mobile system as recited in claim 22, wherein the processor is configured to control at least one of temperature control and timed temperature regulation of the refrigeration unit.

24. A method of reporting fuel consumption of a mobile refrigeration unit in a transportation unit operable to connect to a vehicle for transportation, the method comprising:
    ultrasonically measuring a flow rate of fuel supplied through a passageway between a refrigeration unit engine of said mobile refrigeration unit and a gas tank via an ultrasonic flow meter via an untethered system, the untethered system measuring fuel consumption of the mobile refrigeration unit separately from measurement of fuel consumption of the vehicle used to transport the mobile refrigeration unit;
    detecting a location of said mobile refrigeration unit;
    calculating up-to-the-minute fuel consumption data of the mobile refrigeration unit using said flow rate through said passageway that was ultrasonically measured, and fuel tax data using said detected location and said fuel consumption data; and
    automatically reporting said fuel consumption data associated with the detected location to a remote location via a transmitter operable to directly transmit the fuel consumption data to the remote location and to forward the fuel consumption data to an attached vehicle for reporting in combination with the vehicle's fuel data.

25. A method of reporting fuel consumption as recited in claim 24 wherein said fuel consumption data and said fuel tax data is transmitted to a remote location via at least one of a terrestrial communication system or a satellite communication system.

26. A method as recited in claim 25 wherein said terrestrial communication system is at least one of CDMA, GSM, or UTMS.

27. The method as recited in claim 24, further comprising controlling a timed temperature regulation of the refrigeration unit.

28. A method of reporting fuel consumption of a mobile refrigeration unit in a transportation unit operable to connect to a vehicle for transportation, the method comprising:
    measuring current usage of a refrigeration unit engine of the mobile refrigeration unit, wherein the current usage measured represents power used by said refrigeration unit engine via an ampere meter of an untethered system, the untethered system measuring fuel consumption of the mobile refrigeration unit separately from measurement of fuel consumption of the vehicle used to transport the mobile refrigeration unit;
    detecting a location of said mobile refrigeration unit;
    calculating, by a processor, up-to-the-minute fuel consumption data of the mobile refrigeration unit using said current usage measured, and fuel tax data using said detected location and said fuel consumption data; and
    automatically reporting said fuel consumption data associated with the detected location to a remote location via a transmitter operable to directly transmit the fuel consumption data to the remote location and to forward the fuel consumption data to an attached vehicle for reporting in combination with the vehicle's fuel data.

29. A method of reporting fuel consumption as recited in claim 28 wherein said fuel consumption data and said fuel tax data is transmitted to a remote location via at least one of a terrestrial communication system or a satellite communication system.

30. A method as recited in claim 29 wherein said terrestrial communication system is at least one of CDMA, GSM, or UTMS.

* * * * *